(12) United States Patent
Freeman et al.

(10) Patent No.: US 8,275,479 B1
(45) Date of Patent: Sep. 25, 2012

(54) METHOD AND APPARATUS FOR DEBURRING SPLICES

(75) Inventors: Philip L. Freeman, St. Louis, MO (US); Edward E. Feikert, St. Charles, MO (US); John E. Inman, Frontenac, MO (US)

(73) Assignee: The Boeing Company, Chicago, IL (US)

( * ) Notice: Subject to any disclaimer, the term of this patent is extended or adjusted under 35 U.S.C. 154(b) by 351 days.

(21) Appl. No.: 12/582,881

(22) Filed: Oct. 21, 2009

(51) Int. Cl.
*G06F 19/00* (2011.01)
(52) U.S. Cl. ............................................ 700/160; 228/9
(58) Field of Classification Search .................. 700/160, 700/186, 192, 259; 228/9, 49.1; 408/3; 409/131
See application file for complete search history.

(56) References Cited

U.S. PATENT DOCUMENTS

| | | | | |
|---|---|---|---|---|
| 4,774,524 A | * | 9/1988 | Warbus et al. | 346/44 |
| 4,943,732 A | * | 7/1990 | Economou | 250/559.46 |
| 5,111,406 A | * | 5/1992 | Zachman et al. | 700/160 |
| 5,529,441 A | * | 6/1996 | Kosmowski et al. | 408/1 R |
| 5,745,593 A | * | 4/1998 | Wahawisan et al. | 382/146 |
| 6,223,413 B1 | * | 5/2001 | Crocker et al. | 29/524.1 |
| 6,236,890 B1 | * | 5/2001 | Oldham | 607/68 |
| 6,955,284 B2 | * | 10/2005 | Zakel et al. | 228/9 |
| 6,955,528 B2 | * | 10/2005 | Mukherjee et al. | 417/407 |
| 6,959,103 B2 | * | 10/2005 | Matsunaga et al. | 382/106 |
| 7,218,995 B2 | * | 5/2007 | Jahn et al. | 700/259 |
| 7,626,692 B2 | * | 12/2009 | Engelbart et al. | 356/237.1 |
| 2004/0129756 A1 | * | 7/2004 | Zakel et al. | 228/9 |
| 2007/0034313 A1 | * | 2/2007 | Engelbart et al. | 156/64 |

OTHER PUBLICATIONS

"Aerospace Drilling Systems", Ingersoll Machine Tools, pp. 1-3, retrieved Sep. 2, 2009 http://www.ingersoll.com/ind/stringerdrill.htm.
"Drilling and Trimming Systems",PaR System: Drilling and Trimming Systems for Aerospace Applications, 1 page, retrieved Sep. 2, 2009 http://www.par.com/industry.php?id=105.
Murphy, "An Advanced Deburring and Chamfering System", Robot Systems Division, National Institute of Standards and Technology, pp. 1-7 http://www.isd.mel.nist.gov/documents/murphy/165 isram 90.pdf.

* cited by examiner

*Primary Examiner* — Kidest Bahta
(74) *Attorney, Agent, or Firm* — Yee & Associates, P.C.

(57) ABSTRACT

A method and apparatus for performing an operation on a workpiece. Image information may be received from a camera system at a controller in which the camera system and the controller may be associated with a housing. The workpiece with a number of inconsistencies and a tool system may be moved relative to each other under a control of the controller in which the tool system may be associated with the housing. A number of operations may be performed on the number of inconsistencies on the workpiece holes using the image information under the control of the controller.

31 Claims, 12 Drawing Sheets

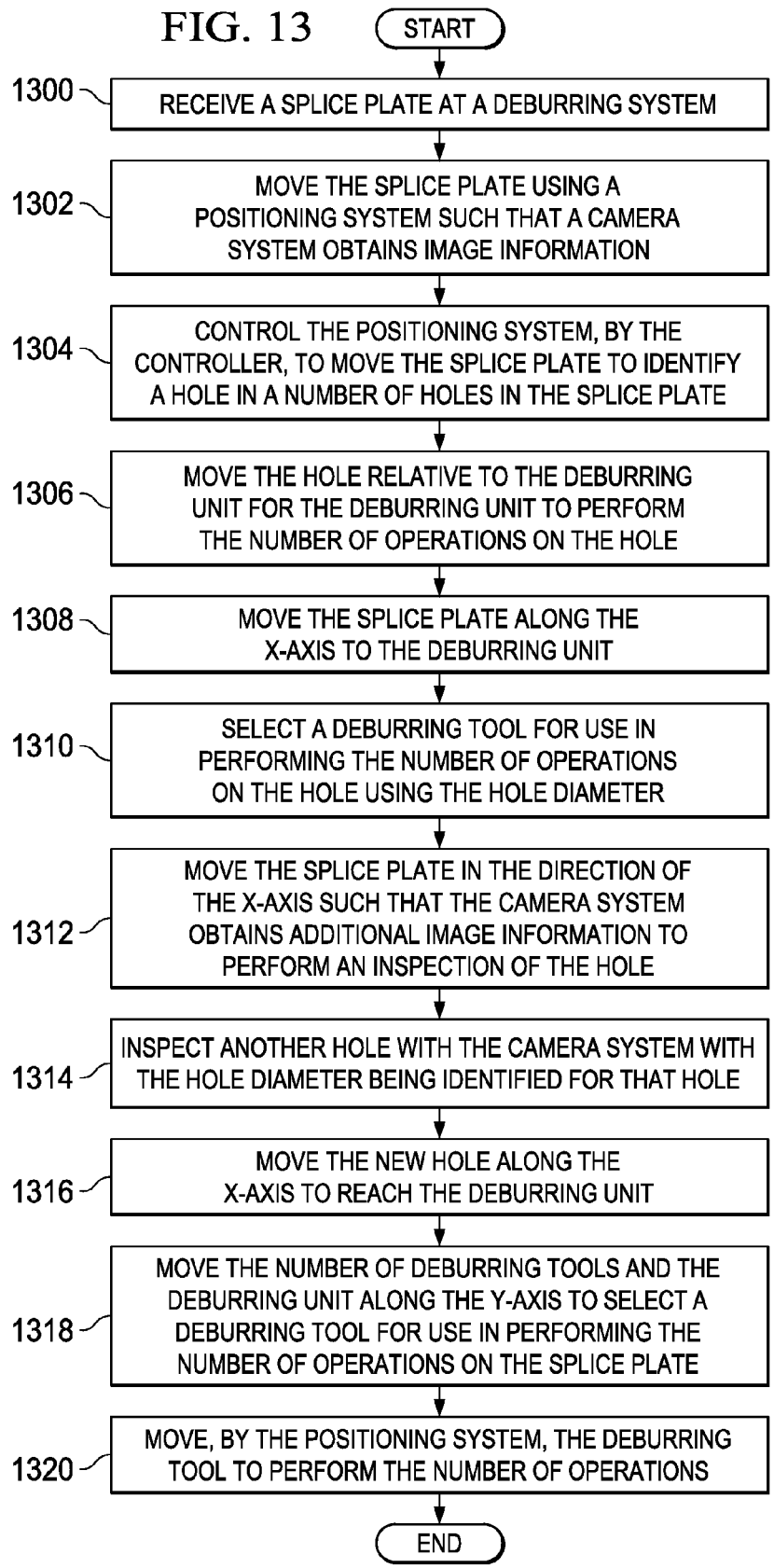

METHOD AND APPARATUS FOR DEBURRING SPLICES

BACKGROUND INFORMATION

1. Field

The present disclosure relates generally to fabricating parts, and in particular, to a method and apparatus for deburring workpieces.

2. Background

In manufacturing parts, machining operations may be performed on workpieces. These machining operations may include, for example, without limitation, drilling, milling, sawing, planing, shaping, and/or other suitable types of operations. The tools used include, for example, without limitation, lathes, milling machines, drills, and/or other suitable devices.

For example, in manufacturing an aircraft, parts and/or sections of the aircraft may be spliced together. For example, a first portion of a fuselage may be spliced to a second portion of a fuselage for the aircraft. This splicing may involve connecting the two portions of the fuselage to each other using a number of splice plates. The splice plates may be secured to the two parts of the fuselage along a joint.

In attaching these pieces to each other, holes may be drilled through the splice plates and the two portions of the fuselage. Thereafter, fasteners may be placed into the holes to secure the two portions of the fuselage to each other.

During the drilling of the holes in the splice plates and in the two portions of the fuselage, an inconsistency in the material in the splice plate and/or in the two portions of the fuselage may occur. This inconsistency in the material may be referred to as a burr. Burrs may take the form of unwanted material remaining after a machining operation, such as, without limitation, drilling to form a hole. A burr may have an undesirable raised edge on a portion of the part in which a hole is made. A burr may be, for example, without limitation, a raised portion of a surface around the hole. Removal of these inconsistencies may be referred to as deburring.

Deburring may be performed manually or through the use of automated machines. Manual deburring, without limitation, may involve a human operator operating a deburring machine to remove inconsistencies. Manual deburring, however, may result in a less than desired finish.

For example, without limitation, in assembling an aircraft, about 150 splice plates may be present. Each splice plate may have about 20 holes or more. Manually deburring each splice plate may be time consuming.

Therefore, it would be advantageous to have a method and apparatus that takes into account at least some of the issues discussed above, as well as possibly other issues.

SUMMARY

In one advantageous embodiment, an apparatus may comprise a housing, a tool system associated with the housing, a positioning system associated with the housing, a camera system associated with the housing, and a controller associated with the housing. The positioning system may be configured to move a workpiece. The camera system may be configured to generate image information for the workpiece. The controller may be configured to receive the image information from the camera system. The controller may also be configured to control the positioning system to move the workpiece and the tool system relative to each other. The controller may be configured to control the tool system to perform a number of operations on a number of inconsistencies on the workpiece using the image information.

In another advantageous embodiment, a portable deburring unit for deburring splices for a fuselage of an aircraft may comprise a portable housing, a deburring unit associated with the portable housing, a positioning system associated with the portable housing, a camera system associated with the portable housing, and a controller associated with the portable housing. The deburring unit may be configured to move along a y-axis and a z-axis in which the deburring unit may comprise a number of deburring tools. Each deburring tool in the number of deburring tools may comprise a spindle, a deburring tool, a tool holder associated with the spindle and configured to hold the deburring tool, and a motor associated with the spindle in which the motor may be configured to rotate the spindle.

Each deburring tool in the number of deburring tools may be configured to remove an inconsistency from a hole of a different size from another deburring tool in the number of deburring tools. The positioning system may be configured to move a splice along an x-axis. The camera system may be configured to generate image information for a splice plate. The controller may be configured to receive the image information from the camera system and to control the positioning system to move the splice plate and the deburring unit relative to each other using the image information by moving at least one of the splice plate and the deburring unit. The controller may also be configured to select a deburring tool from the number of deburring tools for performing an operation on a hole in a number of holes based on a size of the hole.

The controller may be configured to control the deburring unit to perform a number of operations on a number of inconsistencies for the number of holes using the image information in which the number of operations comprises at least one of removing the number of inconsistencies, reducing a size of the number of inconsistencies, and creating a beveled edge in each of the number of holes. The controller may be configured to receive additional image information after the number of operations has been performed on the number of inconsistencies for the number of holes and determine whether the number of holes has a desired quality using the additional image information. The controller may be configured to obtain identification information from the image information and create inspection data using the additional information.

In yet another advantageous embodiment, a method may be present for performing an operation on a workpiece. Image information may be received from a camera system at a controller in which the camera system and the controller may be associated with a housing. The workpiece with a number of inconsistencies and a tool system may be moved relative to each other under a control of the controller in which the tool system may be associated with the housing. A number of operations may be performed on the number of inconsistencies on the workpiece holes using the image information under the control of the controller.

In still yet another advantageous embodiment, a method may be present for performing an operation on a splice plate for an aircraft. Image information may be received from a camera system at a controller in which the camera system and the controller may be associated with a housing. The workpiece with a number of holes with a number of inconsistencies and a deburring unit may be moved relative to each other under a control of the controller using the image information in which the deburring unit may be associated with the housing, in which the deburring unit may have a number of deburring tools, and in which each deburring tool in the number of deburring tools may be configured to remove an inconsistency from a hole of a different size from another deburring tool in the number of deburring tools.

A deburring tool from the number of deburring tools may be selected by the controller for performing an operation on a hole in the number of holes based on a size of the hole. A number of operations may be performed on the number of inconsistencies for the number of holes using the image information under the control of the controller in which the number of operations may comprise at least one of removing the number of inconsistencies, reducing a size of the number of inconsistencies, and creating a beveled edge in each of the number of holes. A determination may be made by the controller as to whether the number of holes has a desired quality using additional image information. Identification information may be obtained from the image information by the controller. Inspection data may be created by the controller using the additional information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 13 is an illustration of a flowchart of a process for performing deburring operations on a splice plate in accordance with an advantageous embodiment.

DETAILED DESCRIPTION

Figure 1:
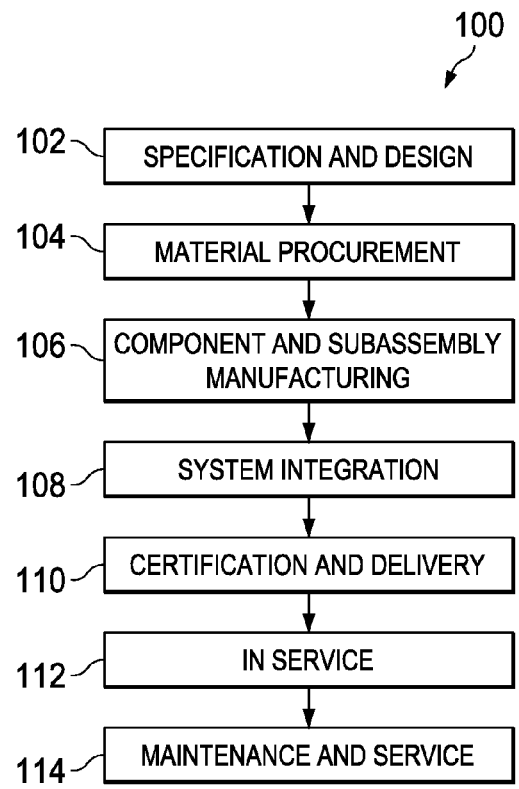
FIG. 1 is an illustration of an aircraft manufacturing and service method in accordance with an advantageous embodiment.
Figure 2:
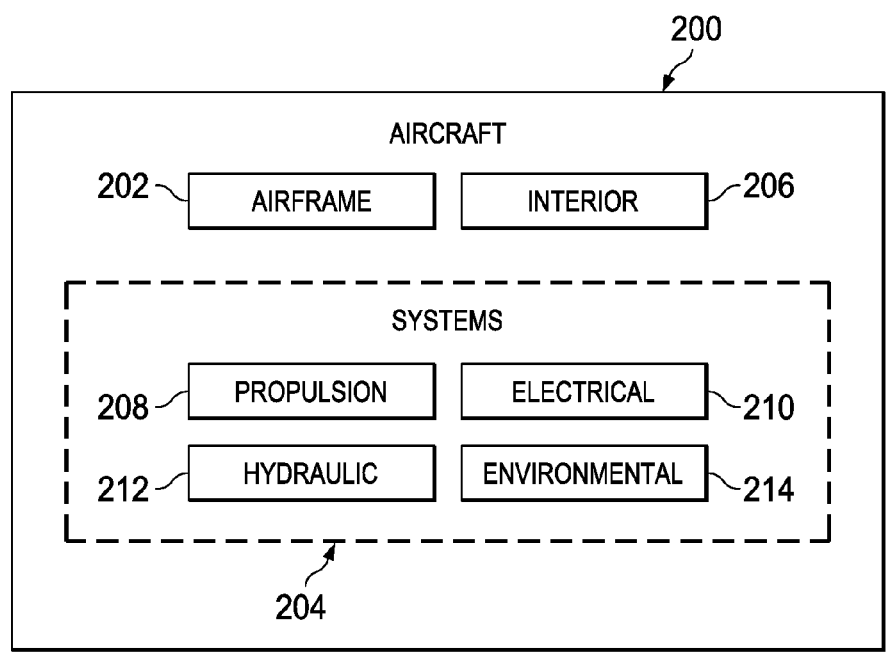
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number of, when referring to items, means one or more items. For example, a number of apparatus embodiments are one or more apparatus embodiments. A number of apparatus embodiments, method embodiments, or a combination thereof may be utilized while aircraft 200 is in service 112 and/or during maintenance and service 114 in FIG. 1. For example, operations on inconsistencies in parts of aircraft 200 may be performed during component and subassembly manufacturing 106. These operations on inconsistencies in parts also may be performed during maintenance and service 114 when existing parts may be replaced or reworked. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that one solution to manual deburring of parts may be to use automated equipment. This equipment may include, for example, without limitation, a computer numerical control machine having a deburring tool. With this type of machine, the splice plates are moved from the structure to the computer numerical control machine. The computer numerical control machine may then perform operations to remove inconsistencies that may have been formed when holes were drilled in the splice plates. This type of process may be more accurate than manual deburring of these parts.

Using computer numerical control machines, however, may require more time to assemble structures, such as a fuselage, than desired. For example, each of the splice plates may be moved from the structure where holes were drilled in the splice plates to the computer numerical control machine for performing deburring operations. Thereafter, the splice plates may be moved back to the fuselage for assembly. The time for moving these splice plates back and forth to the fuselage may increase the time needed to assemble an aircraft. This increased time may delay the time at which the aircraft may be ready for certification or delivery to a customer.

Thus, the different advantageous embodiments may provide a method and apparatus for performing operations on a number of inconsistencies in a workpiece for a number of holes. In one advantageous embodiment, the apparatus may comprise a housing, a tool system, a positioning system, a camera system, and a controller. The tool system, the positioning system, the camera system, and the controller may be associated with the housing. The positioning system may be configured to move the workpiece with a number of holes. The camera system may be configured to generate image information for the workpiece. The controller may be configured to receive the image information from the camera system, control the positioning system to move the workpiece and the tool system relative to each other, and control the tool system to perform a number of operations on a number of inconsistencies on the workpiece using the image information.

Figure 3:
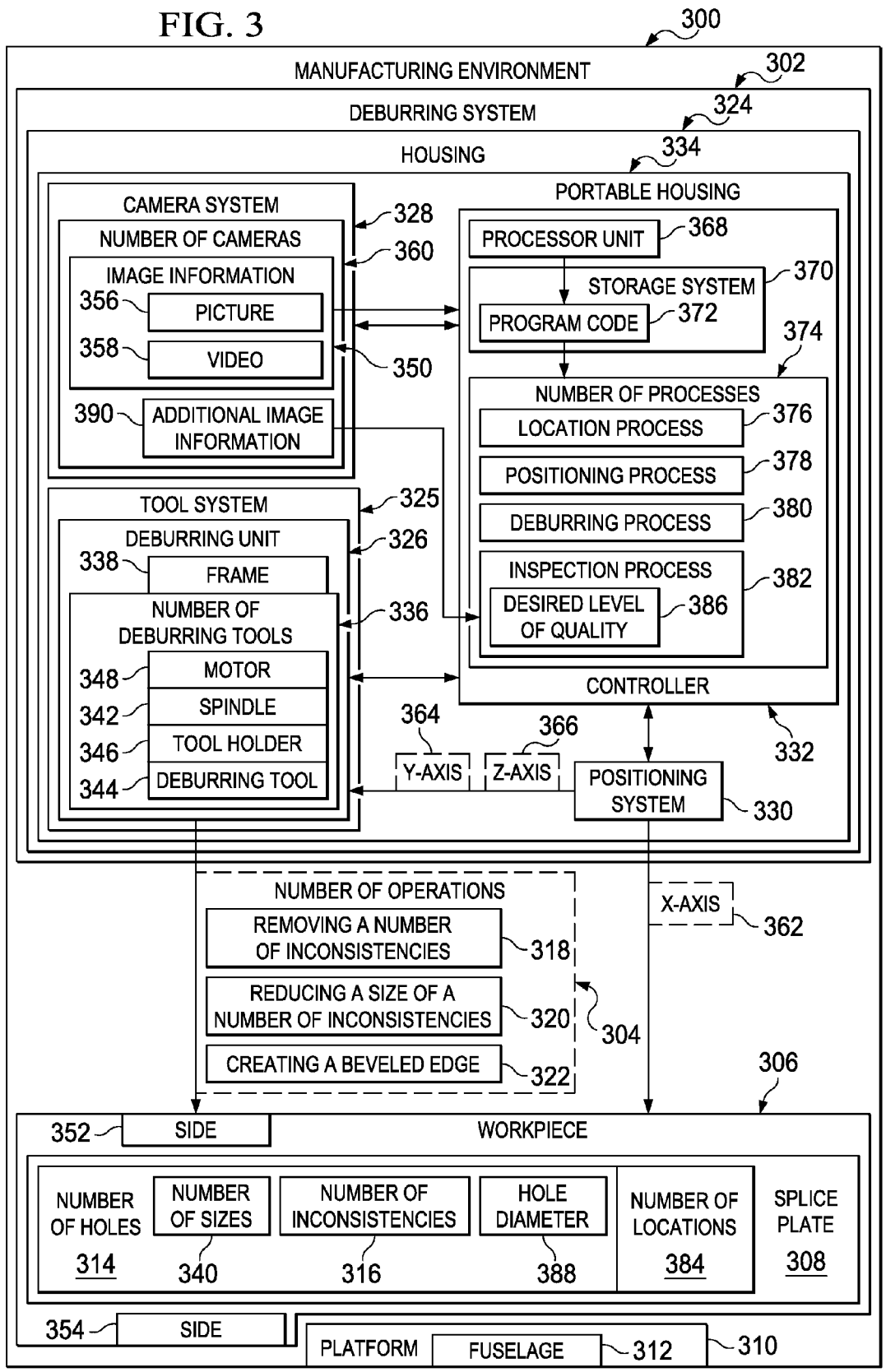
FIG. 3 is an illustration of a manufacturing environment in accordance with an advantageous embodiment.

With reference now to FIG. 3, an illustration of a manufacturing environment is depicted in accordance with an advantageous embodiment. Manufacturing environment 300 may be an example of an environment that may be used to manufacture parts for aircraft 200 in FIG. 2.

In this illustrative example, manufacturing environment 300 may include deburring system 302. Deburring system 302 may perform number of operations 304 on workpiece 306. In this illustrative example, workpiece 306 may take the form of splice plate 308. Splice plate 308 may be used in platform 310. In this example, platform 310 may take the form of aircraft 200 in FIG. 2. In this illustrative example, workpiece 306 may be used in fuselage 312 of platform 310.

Number of holes 314 may be present in workpiece 306. Additionally, number of inconsistencies 316 may be present for number of holes 314. For example, without limitation, when number of holes 314 is formed, inconsistencies, such as a burr, a raised portion of a surface around a hole in number of holes 314, unwanted material around number of holes 314, or some other undesirable inconsistency may be present.

In these illustrative examples, number of operations 304 may be performed on number of holes 314. Number of operations 304 may be, for example, at least one of removing number of inconsistencies 318, reducing a size of number of inconsistencies 320, creating a beveled edge 322, and/or some other suitable operation.

In these illustrative examples, deburring system 302 may comprise housing 324, tool system 325, camera system 328, positioning system 330, and controller 332. Tool system 325, camera system 328, positioning system 330, and controller 332 may be associated with housing 324. In other words, these components may be located on or inside housing 324.

Housing 324 may take various forms. For example, without limitation, housing 324 may contain one or more of the components in tool system 325, camera system 328, positioning system 330, and controller 332. In one example, housing 324 may be a frame without any enclosure.

Housing 324, in these illustrative examples, may take the form of portable housing 334. Portable housing 334 may be a structure that may be carried by one or two operators. In these examples, portable housing 334 may be moved onto or inside of fuselage 312 to perform number of operations 304 on splice plate 308. Housing 324 may provide a structure or frame for the other components in deburring system 302.

In this illustrative example, tool system 325 may take the form of deburring unit 326. Deburring unit 326 may comprise number of deburring tools 336 and frame 338. Number of deburring tools 336 may be mounted on frame 338 for deburring unit 326. In these illustrative examples, number of deburring tools 336 may be used to perform number of operations 304 on number of holes 314 with number of sizes 340. In other words, each deburring tool in number of deburring tools 336 may be appropriated or used for a different size in number of sizes 340 for number of holes 314.

In these illustrative examples, each of number of deburring tools 336 may comprise spindle 342, deburring tool 344, tool holder 346, and motor 348. Deburring tool 344 may be attached to tool holder 346. Tool holder 346 may be attached to spindle 342. Motor 348 may turn spindle 342 to perform number of operations 304. In these illustrative examples, motor 348 may be an air motor, an electrical motor, or some other suitable type of motor.

Further, number of deburring tools 336 may be located on side 352 and side 354 of workpiece 306. In this manner, number of deburring tools 336 may be positioned to perform number of operations 304 on number of inconsistencies 316 that may be located on either side of number of holes 314.

Camera system 328 may be configured to generate image information 350, which may be sent to controller 332 for processing. Image information 350 may take a number of different forms. For example, without limitation, image information 350 may be picture 356, video 358, and/or some other suitable type of information.

In a similar fashion, with number of deburring tools 336 for deburring unit 326, camera system 328 may include number of cameras 360 that also may be located on side 352 and side 354 of workpiece 306. In this manner, number of cameras 360 may obtain image information 350 for both sides of number of holes 314.

Positioning system 330 may be controlled by controller 332 to move workpiece 306 and deburring unit 326. Workpiece 306 and deburring unit 326 may be moved relative to each other. For example, in one illustrative embodiment, positioning system 330 may move workpiece 306 along x-axis 362. Positioning system 330 may move deburring unit 326 along y-axis 364 and z-axis 366.

The movement of deburring unit 326 may be for the entire unit or for particular ones of number of deburring tools 336. For example, without limitation, the movement of deburring unit 326 along y-axis 364 may involve moving frame 338 along y-axis 364. Movement of deburring unit 326 along z-axis 366 may involve moving one or more of number of deburring tools 336 along z-axis 366.

In these illustrative examples, controller 332 may control the operation of camera system 328, positioning system 330, and deburring unit 326. Controller 332 may control the acquisition of image information 350 by camera system 328. Controller 332 may control the movement of at least one of workpiece 306 and deburring unit 326 using positioning system 330. Additionally, controller 332 may control the operation of deburring unit 326 to perform number of operations 304. This control also may include movement of one or more of number of deburring tools 336.

The movement of at least one of workpiece 306 and deburring unit 326 may be performed using image information 350 received from camera system 328. In these illustrative examples, controller 332 may comprise processor unit 368 and storage system 370.

Processor unit 368 may be, for example, without limitation, a central processing unit, a digital signal processor, an application-specific integrated circuit, a multi-core processor, or some other suitable type of processing system. Storage system 370 may include at least one of a random access memory, a flash drive, a thumb drive, a solid state disk drive, a hard disk drive, or some other suitable type of device.

In these illustrative examples, program code 372 may be stored on storage system 370 for execution by processor unit 368. Running program code 372 on processor unit 368 provides number of processes 374 for controller 332 to control deburring unit 326 and positioning system 330.

In these illustrative examples, number of processes 374 may include, for example, without limitation, location process 376, positioning process 378, deburring process 380, inspection process 382, and/or other suitable processes.

Location process 376 may be used to identify number of locations 384 on workpiece 306 on which number of inconsistencies 316 may be present. In these illustrative examples, the identification of number of locations 384 may be performed by identifying the location of number of holes 314 from image information 350. In other advantageous embodiments, number of locations 384 may be identified by locating number of inconsistencies 316 rather than locating number of holes 314.

Positioning process 378 may be used to provide continual movement of workpiece 306 by positioning system 330, while locating number of locations 384. Additionally, positioning process 378 also may be used to move workpiece 306 and deburring unit 326 relative to each other in the manner described above. Deburring process 380 may be used to operate number of deburring tools 336 in deburring unit 326 to perform number of operations 304 on workpiece 306.

Inspection process 382 may be used to determine whether number of inconsistencies 316 have been removed, reduced in size, or otherwise processed. Inspection process 382 may determine whether workpiece 306 has desired level of quality 386. Desired level of quality 386 may be set based on manufacturing specifications or desired tolerances for workpiece 306. For example, without limitation, desired level of quality 386 may require that number of inconsistencies 316 be reduced to some size or removed entirely from workpiece 306.

Additionally, inspection process 382 also may perform inspections for other features on workpiece 306 for operations other than number of operations 304 performed on number of inconsistencies 316. For example, without limitation, inspection process 382 also may inspect workpiece 306 to determine whether workpiece 306 has dimensions that meet tolerances or limits set for workpiece 306.

In one illustrative example, when number of holes 314 are present in splice plate 308, positioning process 378 may use image information 350 to measure hole diameter 388 for number of holes 314. Hole diameter 388 may be used to select a deburring tool from number of deburring tools 336 to perform number of operations 304 on a particular hole.

In this example, number of operations 304 may include creating a beveled edge 322. With this type of operation, inspection process 382 may use additional image information 390 obtained after number of operations 304 to inspect for desired level of quality 386.

In this manner, performing number of operations 304 with deburring system 302 may be performed automatically without operator input or intervention after splice plate 308 has been placed into deburring system 302. As a result, human operators may perform other operations, such as drilling holes in other splice plates or fastening splice plates to fuselage sections in fuselage 312.

In this manner, the amount of time needed to assemble platform 310 may be reduced. Further, with deburring system 302 having portable housing 334, deburring system 302 may be located in or near fuselage 312 during assembly of fuselage 312 in manufacturing environment 300.

The illustration of manufacturing environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, additional deburring systems in addition to deburring system 302 may be present in manufacturing environment 300 to perform number of operations 304 on other workpieces in addition to workpiece 306. As yet another example, deburring system 302 may be used with other types of workpieces, other than splice plate 308. For example, without limitation, deburring system 302 may be used with a spar, a rib, or other fittings.

In yet other advantageous embodiments, deburring system 302 may include other components in addition to the ones illustrated. For example, without limitation, deburring system 302 also may include a drill to drill additional holes that may be needed in workpiece 306.

Figure 4:
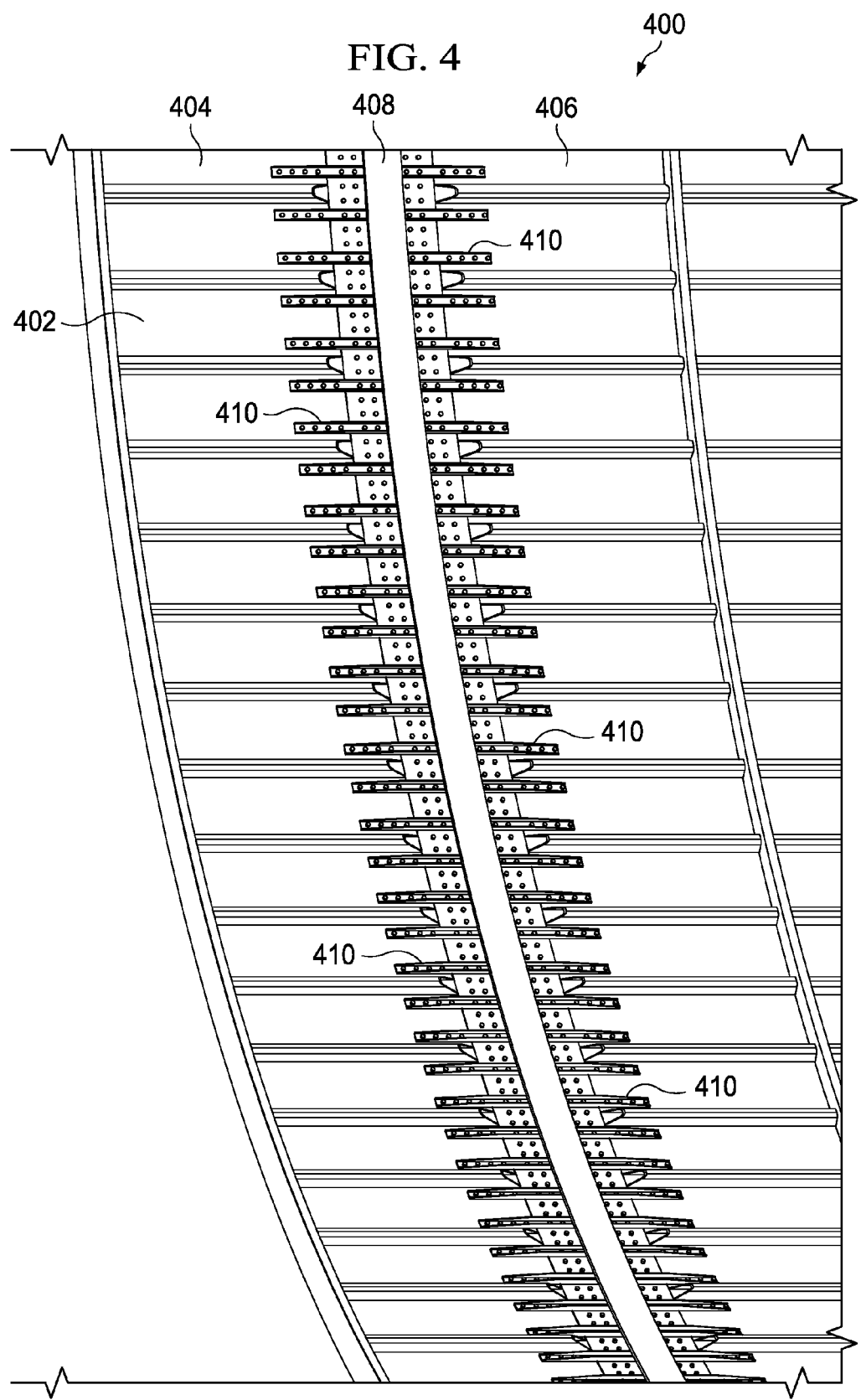
FIG. 4 is an illustration of a portion of a platform in which operations may be performed in accordance with an advantageous embodiment.

With reference now to FIG. 4, an illustration of a portion of a platform in which operations may be performed is depicted in accordance with an advantageous embodiment. In this illustrative example, a portion of platform 400 is depicted. Platform 400 may be fuselage 402. Fuselage 402 may be comprised of section 404 and section 406. Joint 408 may be present between section 404 and section 406 of fuselage 402.

Splice plates 410 may be present in joint 408. Number of operations 304 from FIG. 3 may be performed on splice plates 410 in these illustrative examples.

Figure 5:
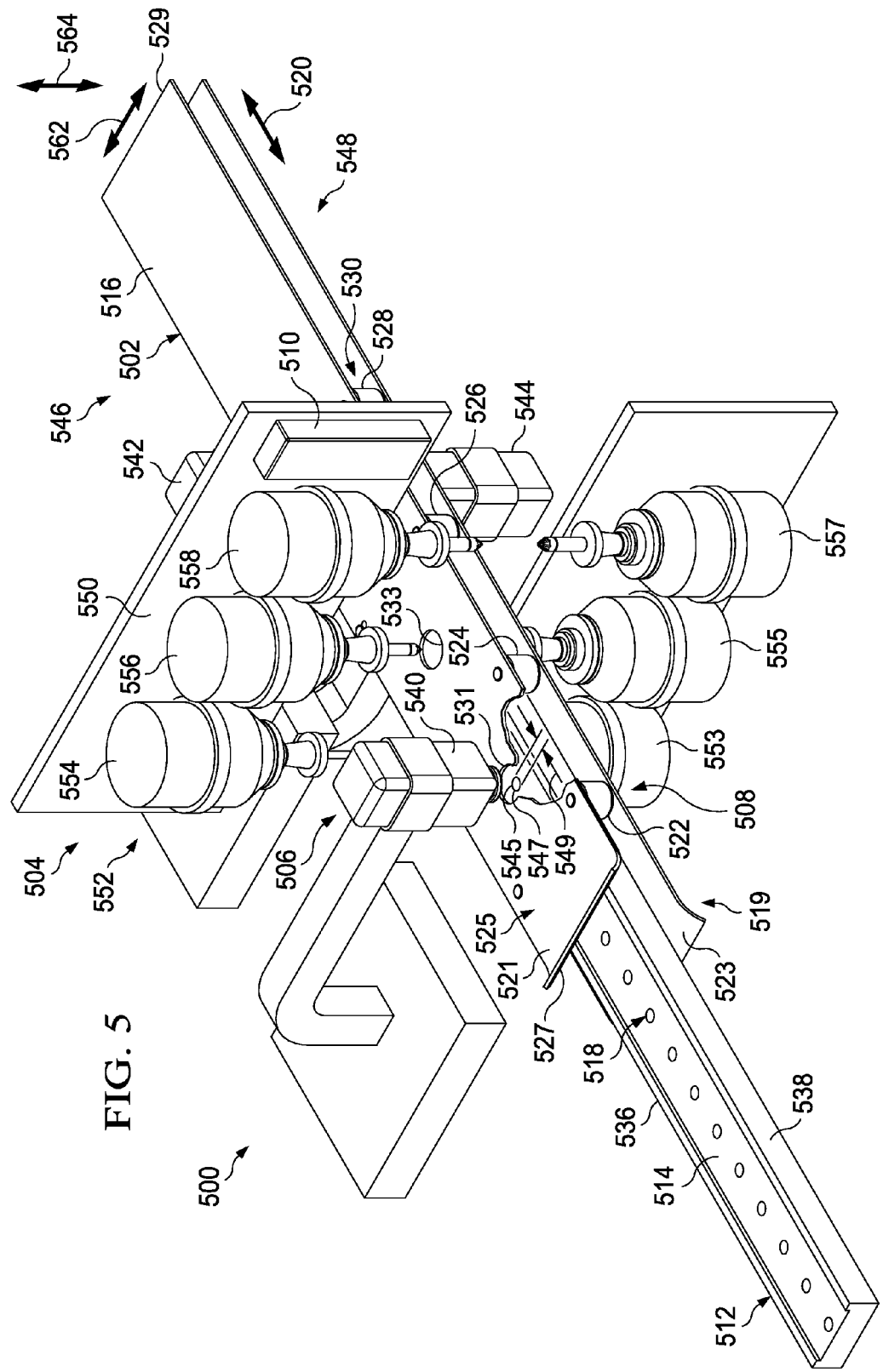
FIG. 5 is an illustration of a perspective view of a deburring system in accordance with an advantageous embodiment.

With reference now to FIG. 5, an illustration of a perspective view of a deburring system is depicted in accordance with an advantageous embodiment. In this illustrative example, deburring system 500 may be an example of one implementation for deburring system 302 in FIG. 3.

In this illustrative example, deburring system 500 may include housing 502, deburring unit 504, camera system 506, positioning system 508, and controller 510. Deburring system 500 may be used to perform operations on workpiece 512, which may be splice plate 514 in these examples. As illustrated, splice plate 514 has holes 518. Splice plate 514 may be received by positioning system 508 and moved in the direction of x-axis 520.

In this example, housing 502 may take the form of slide track 516. Slide track 516 may have first plate 521 on first side 525 and second plate 523 on second side 519. Splice plate 514 may be slid into end 527 of slide track 516 and exit at end 529. In these illustrative examples, slide track 516 may have hole 531, hole 533, and another hole, hidden by deburring unit 504 in this view, in first plate 521. These holes may provide access to camera system 506 and deburring unit 504.

In this illustrative example, positioning system 508 may include number of rollers 530. Number of rollers 530 may include rollers 522, 524, 526, and 528 on side 538 of splice plate 514 and four additional rollers, not shown in this view, on side 536 of splice plate 514. Number of rollers 530 may engage sides 536 and 538 of splice plate 514 to move splice plate 514 along x-axis 520. Further, one or more of number of rollers 530 may be motorized and/or under the control of controller 510.

Controller 510 may control the movement of splice plate 514 using image information received from camera system 506. Camera system 506 may include camera 540, camera 542, and camera 544. Camera 540 and camera 542 may be located on first side 546 of deburring system 500. Camera 544 may be located on second side 548 of deburring system 500. Camera 540 may generate image information of location 545 for hole 547 from among holes 518 in splice plate 514.

Based on location 545, controller 510 may cause positioning system 508 to move splice plate 514 until hole 547 reaches deburring unit 504. In this view, first plate 521 may be depicted with a portion of first plate 521 removed such that location 545 and hole 547 may be seen.

Additionally, camera 540 may generate image information used by positioning system 508 to identify diameter 549 for hole 547. With this information, deburring unit 504 may selectively perform operations on hole 547 when hole 547 reaches deburring unit 504. Further, camera 540 also may be used to determine whether a particular hole, such as hole 547 in holes 518, needs a number of operations performed on hole 547 by deburring unit 504.

In this illustrative example, deburring unit 504 may comprise frame 550 and number of deburring tools 552. Deburring unit 504 may have deburring tools 554, 556, and 558 in number of deburring tools 552 on first side 546 of deburring system 500. Additionally, deburring unit 504 also may have deburring tools 553, 555, and 557 in number of deburring tools 552 on second side 548 of deburring system 500.

In this illustrative example, number of deburring tools 552 in deburring unit 504 may be moved about y-axis 562 and/or about z-axis 564. Movement about y-axis 562 may be performed to select a particular deburring tool in number of deburring tools 552 to perform number of operations on a hole in holes 518 in splice plate 514. Movement of number of deburring tools 552 about z-axis 564 may allow for the selected deburring tool in number of deburring tools 552 to move relative to a hole, such as hole 547, to perform operations on splice plate 514.

The identification and movement of each hole relative to deburring unit 504 may be performed in this manner. Additionally, after holes 518 have been processed by deburring unit 504, camera 542 and camera 544 may be used to obtain additional image information for use by controller 510 to determine whether a desired level of quality is present for holes 518.

In this illustrative example, deburring tool 554 may have a ¼ inch edge forming tool to perform deburring. Deburring tool 556 may have a ⁵⁄₁₆ inch edge forming tool, and deburring tool 558 may have a ⅜ inch edge forming tool. In a similar fashion, corresponding deburring tools may have similar edge forming tools. For example, without limitation, deburring tool 553 may have a ¼ inch edge forming tool to perform deburring, deburring tool 555 may have a ⁵⁄₁₆ inch edge forming tool, and deburring tool 557 may have a ⅜ inch edge forming tool.

Figure 6:
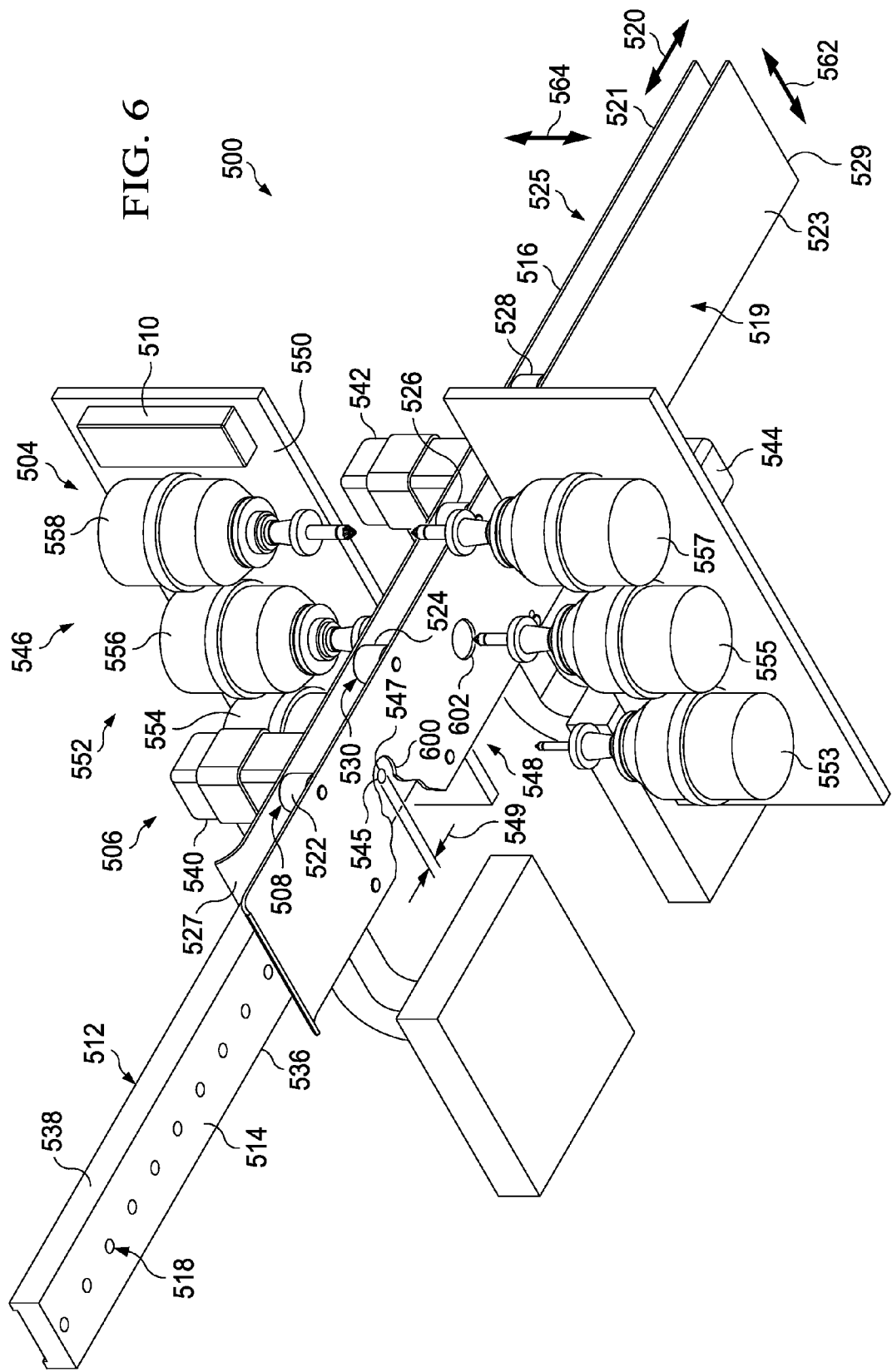
FIG. 6 is an illustration of another perspective view of a deburring system in accordance with an advantageous embodiment.

With reference now to FIG. 6, an illustration of another perspective view of a deburring system is depicted in accordance with an advantageous embodiment. As depicted in this example, second plate 523 may have hole 600, hole 602, and another hole, hidden in this view by deburring unit 504.

Figure 7:
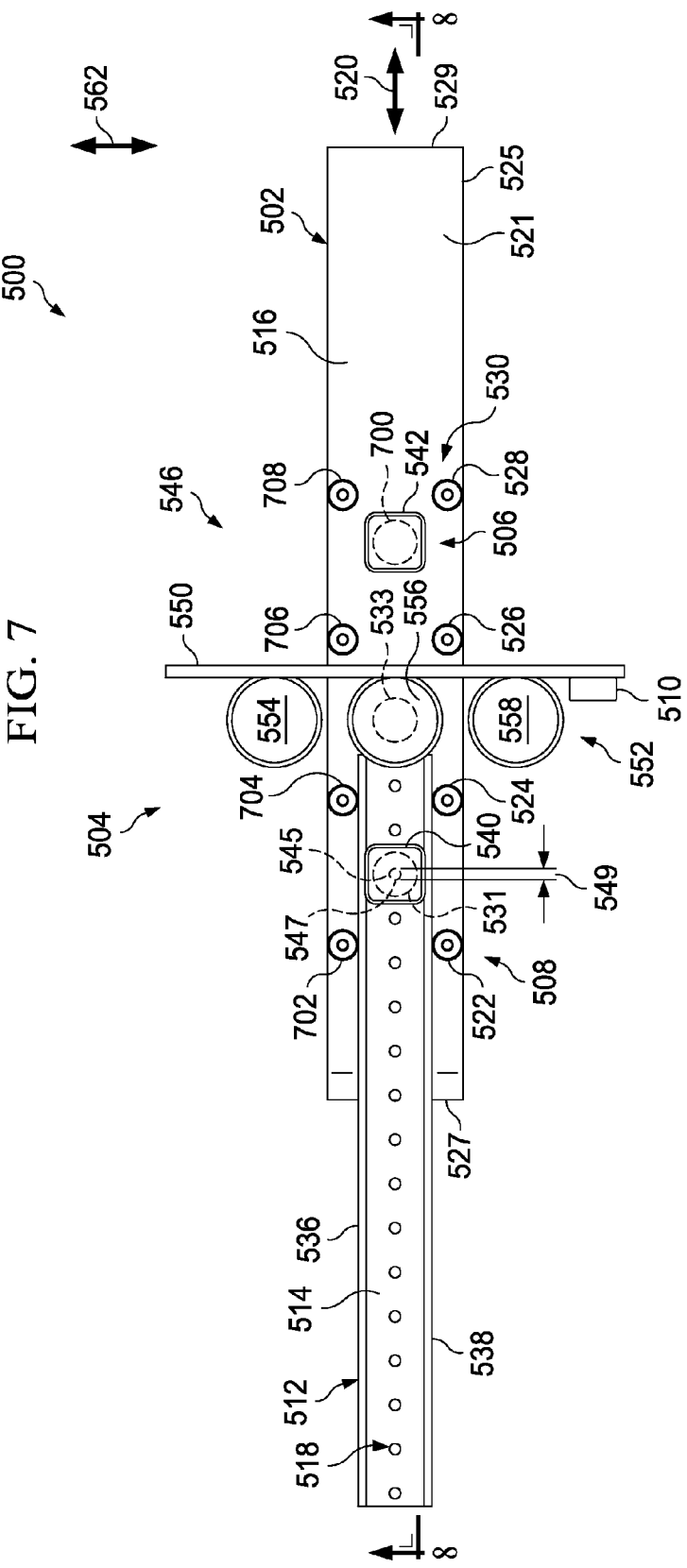
FIG. 7 is an illustration of an exposed top view of a deburring system in accordance with an advantageous embodiment.

Turning now to FIG. 7, an illustration of an exposed top view of a deburring system is depicted in accordance with an advantageous embodiment. In this illustrative example, first side 546 of deburring system 500 is depicted. In this view, first plate 521 on first side 525 has been removed to illustrate components in deburring system 500. In this illustrative example, hole 700 in first plate 521 of slide track 516 may be seen. Further, rollers 702, 704, 706, and 708 of number of rollers 530 for positioning system 508 may be seen on side 536 of splice track 514.

Figure 8:
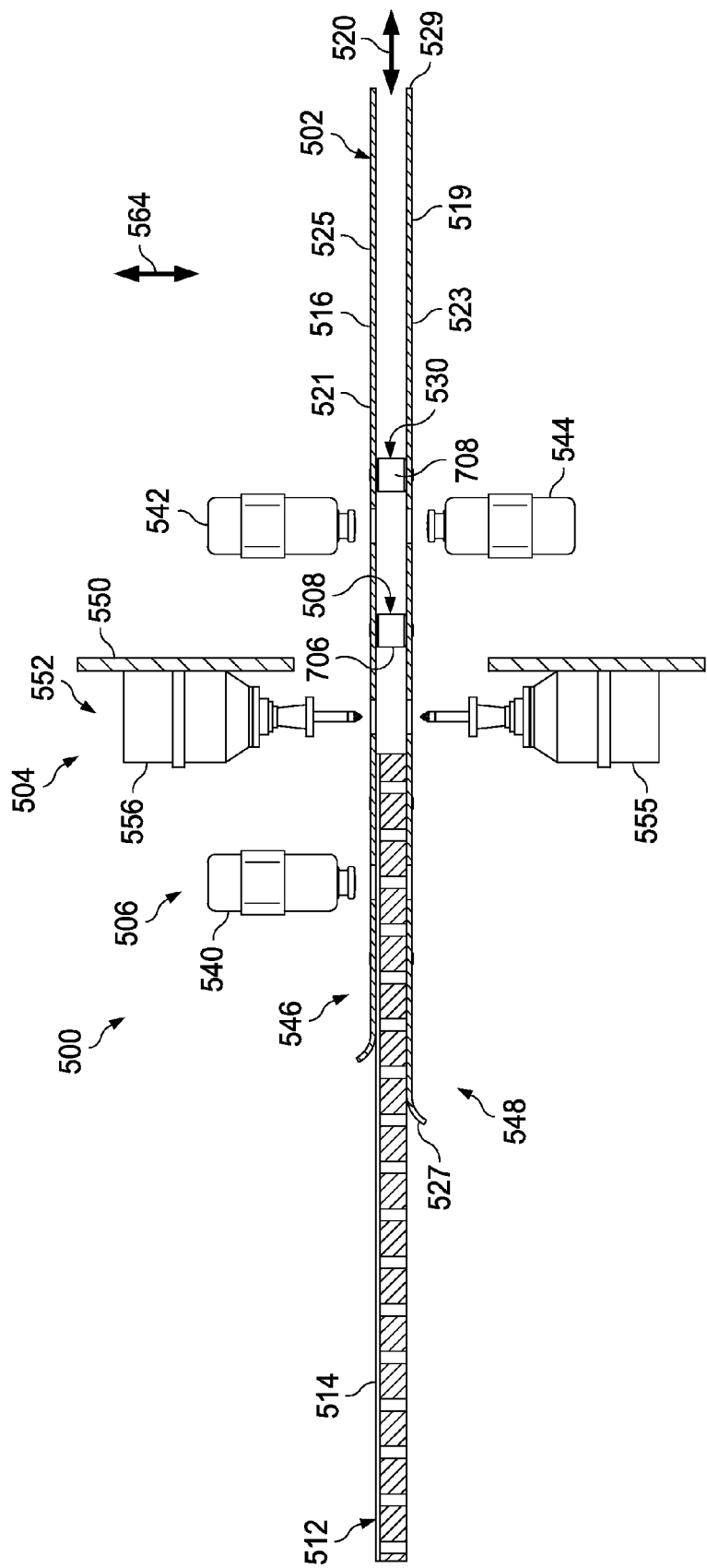
FIG. 8 is an illustration of a cross-sectional side view of a deburring system in accordance with an advantageous embodiment.

With reference now to FIG. 8, an illustration of a cross-sectional side view of deburring system 500 is depicted in accordance with an advantageous embodiment. In this illustrative example, a view of deburring system 500 taken along lines 8-8 in FIG. 7 is presented.

Figure 9:
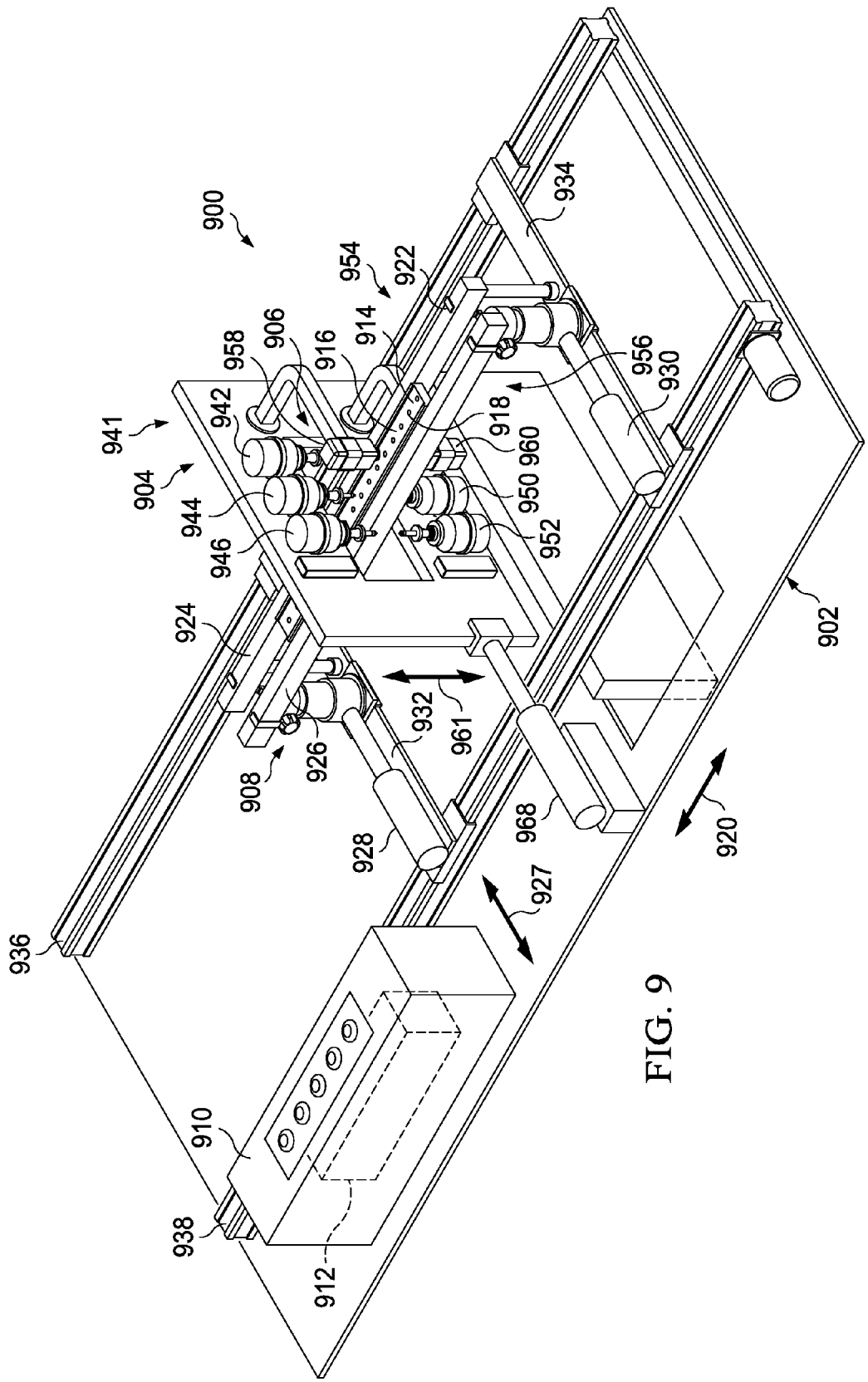
FIG. 9 is an illustration of a perspective view of a deburring system in accordance with an advantageous embodiment.

With reference now to FIG. 9, an illustration of a perspective view of a deburring system is depicted in accordance with an advantageous embodiment. In this illustrative example, a perspective view of deburring system 900 is depicted in accordance with an advantageous embodiment.

In this illustrative example, deburring system 900 may comprise housing 902, deburring unit 904, camera system 906, positioning system 908, controller 910, and power connection 912. In this illustrative example, deburring system 900 may be used to perform a number of operations on workpiece 914, which may take the form of splice plate 916. As illustrated, splice plate 916 may have holes 918. Splice plate 916 may be moved in the direction of x-axis 920 in these illustrative examples.

In this illustrative example, positioning system 908 may include clamping unit 922, which may clamp splice plate 916 between elongate member 924 and elongate member 926. Elongate member 924 may be moved in the direction of arrow 927 by air cylinders 928 and 930. In these examples, elongate member 924 and elongate member 926 may be connected to bar 932 and bar 934. Elongate member 924 may be moveable in the direction of arrow 927 along bar 932 and bar 934. In these examples, elongate member 926 may be fixed to bar 932 and bar 934.

After splice plate 916 is clamped between elongate member 924 and elongate member 926 in clamping unit 922, positioning system 908 may be moved along track 936 and track 938 in the direction of x-axis 920.

In this example, deburring unit 904 may have number of deburring tools 941. Number of deburring tools 941 may include deburring tools 942, 944, 946, 950, 952, and another deburring tool, not seen in this view. Deburring tools 942, 944, and 946 may be located on side 954 of deburring system 900. Deburring tools 950, 952, and the deburring tool hidden in this view may be located on side 956 of deburring system 900.

In this illustrative example, camera system 906 may comprise camera 958 and camera 960. Camera 958 may be located on side 954 of deburring system 900, while camera 960 may be located on side 956 of deburring system 900. In this illustrative example, camera 958 and/or camera 960 may generate image information for use by controller 910.

In these illustrative examples, deburring unit 904 may move about y-axis 927 to select one of deburring tools 942, 944, and 946 and one of deburring tools 950, 952 and the deburring tool hidden from view for use in performing operations on splice plate 916. The selected deburring tools may be moved along z-axis 961. Air cylinder 968 may provide power to operate deburring unit 904 in these examples.

Figure 10:
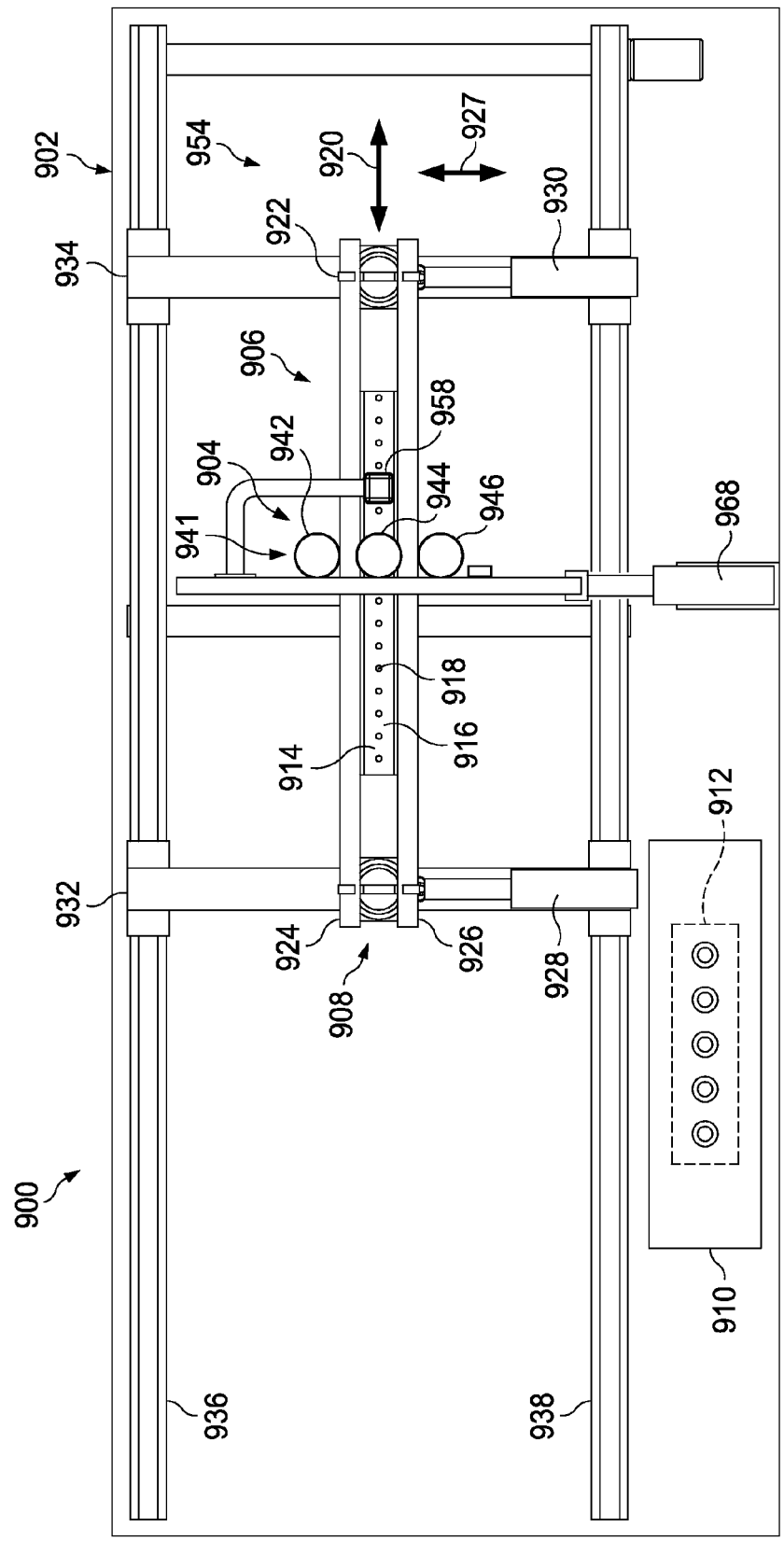
FIG. 10 is an illustration of a top view of a deburring system in accordance with an advantageous embodiment.

With reference now to FIG. 10, an illustration of a top view of a deburring system is depicted in accordance with an advantageous embodiment. Deburring system 900 in FIG. 9 is shown in a top view in this illustration.

Figure 11:
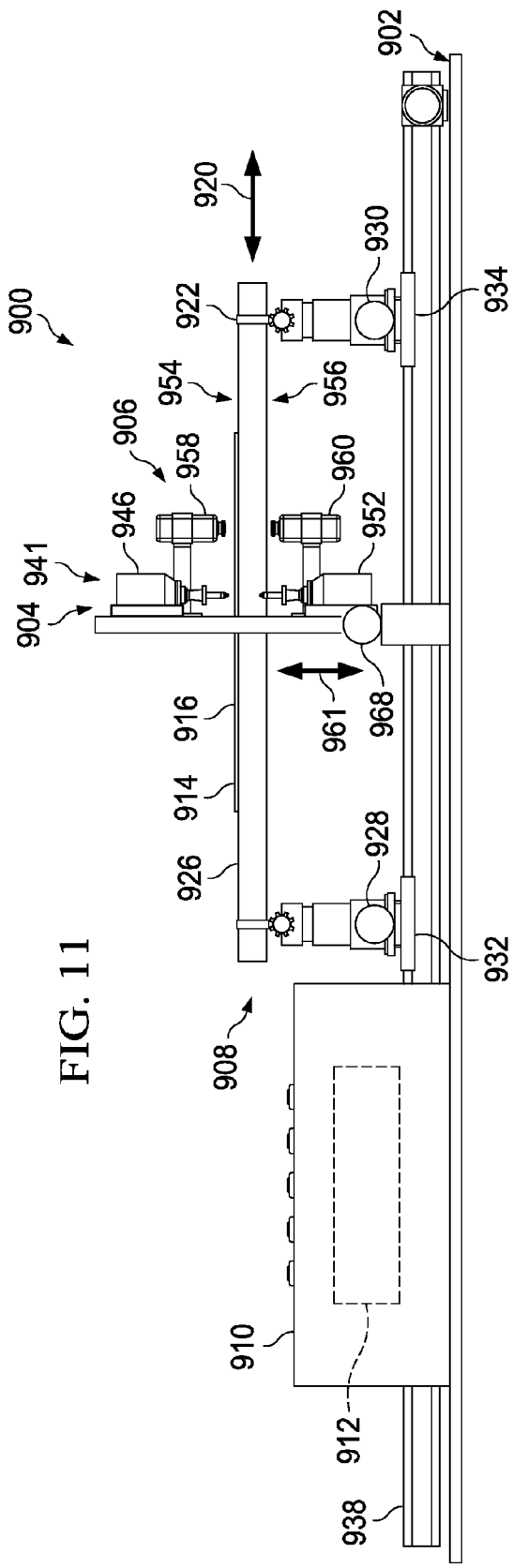
FIG. 11 is an illustration of a side of a deburring system in accordance with an advantageous embodiment.

With reference now to FIG. 11, an illustration of a side view of a deburring system is depicted in accordance with an advantageous embodiment. In this illustrative example, side 954 of deburring system 900 is seen in this illustration.

Figure 12:
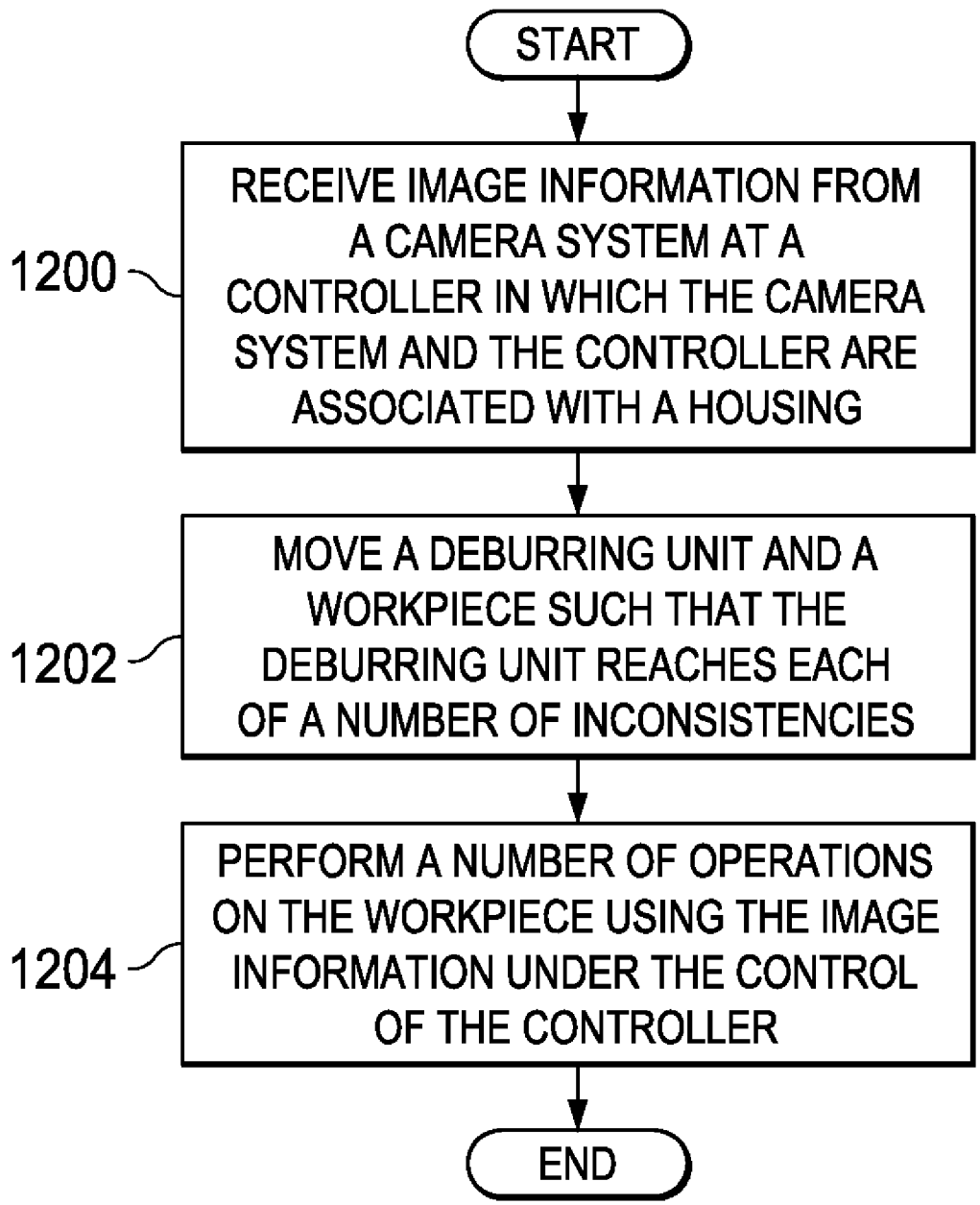
FIG. 12 is an illustration of a flowchart of a process for performing operations on a workpiece in accordance with an advantageous embodiment.

With reference now to FIG. 12, an illustration of a flowchart of a process for performing operations on a workpiece is depicted in accordance with an advantageous embodiment. The process illustrated in FIG. 12 may be implemented in manufacturing environment 300 in FIG. 3. In particular, deburring system 302 in FIG. 3 may be used to perform number of operations 304 on workpiece 306 in the manner illustrated in this figure.

The process may begin by receiving image information 350 from camera system 328 at controller 332 in which camera system 328 and controller 332 are associated with housing 324 (operation 1200). Deburring unit 326 and workpiece 306 may be moved such that deburring unit 326 reaches each of number of inconsistencies 316 (operation 1202). Each of number of inconsistencies 316 may be located using image information 350.

Number of operations 304 may be performed on workpiece 306 using image information 350 under the control of controller 332 (operation 1204), with the process terminating thereafter. In this example, the operations may be performed each time a particular inconsistency within number of inconsistencies 316 is reached from moving deburring unit 326 and workpiece 306.

With reference now to FIG. 13, an illustration of a flowchart of a process for performing deburring operations on a splice plate is depicted in accordance with an advantageous embodiment. In this example, number of operations 304 may be performed on workpiece 306. Workpiece 306 may take the form of splice plate 308. The process illustrated in FIG. 13 may be implemented in manufacturing environment 300 in FIG. 3.

The process may begin by receiving splice plate 308 at deburring system 302 (operation 1300). Splice plate 308 may be moved by positioning system 330 such that camera system 328 obtains image information 350 (operation 1302). With image information 350, controller 332 may control positioning system 330 to move splice plate 308 to identify a hole in number of holes 314 in splice plate 308 (operation 1304). In some illustrative examples, image information 350 also may be used to identify an offset of the hole with respect to deburring unit 326.

When a hole within number of holes 314 is identified, the hole in number of holes 314 may be moved relative to deburring unit 326 for deburring unit 326 to perform number of operations 304 on the hole (operation 1306).

Additionally, image information 350 also may be used to identify hole diameter 388 for the hole. Thereafter, splice plate 308 may be moved along x-axis 362 to move the hole to deburring unit 326 (operation 1308). Further, using hole diameter 388, controller 332 may select deburring tool 344 from number of deburring tools 336 for use in performing number of operations 304 on the hole in number of holes 314 (operation 1310).

After the number of operations has been performed for the hole, splice plate 308 may be moved in the direction of x-axis 362 such that camera system 328 obtains additional image information 390 to perform an inspection of the hole (operation 1312).

As the hole is moved for inspection, another hole in number of holes 314 may be inspected by camera system 328 with hole diameter 388 being identified for that hole (operation 1314). In a similar fashion, the new hole may be advanced or moved along x-axis 362 to reach deburring unit 326 (operation 1316).

In these examples, number of deburring tools 336 and deburring unit 326 may be moved along y-axis 364 to select deburring tool 344 for use in performing number of operations 304 on splice plate 308 (operation 1318). Further, deburring tool 344 may be moved by positioning system 330 along z-axis 366 to perform number of operations 304 (operation 1320), with the process terminating thereafter. Additionally, an additional deburring tool may be located on an opposite side of splice plate 308 in which similar operations may be performed.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments may provide a method and apparatus for performing operations on a workpiece. In one advantageous embodiment, an apparatus may comprise a housing, a deburring unit, a positioning system, a camera system, and a controller. The positioning system may be configured to move a workpiece. The camera system may be configured to generate image information for the workpiece. The controller may be configured to receive the image information from the camera system and control the positioning system to move the workpiece and the deburring unit relative to each other. The controller also may be configured to control the deburring unit to perform a number of operations on a number of inconsistencies on the workpiece using the image information.

With the different advantageous embodiments, the time needed to perform operations on inconsistencies on a workpiece may be reduced. By reducing the amount of time needed to perform operations, such as deburring operations on a workpiece, such as a splice plate, the time needed to assemble or manufacture a platform, such as an aircraft, may be reduced. The deburring and inspection of the splice plate may occur while an operator is performing other operations.

In these illustrative examples, the deburring system also may be portable. In this manner, the deburring system may be moved close to or into the platform in which deburring operations are performed for various parts or components.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a housing;
    a tool system associated with the housing configured to perform a number of operations on a workpiece;
    a positioning system associated with the housing and configured to move the workpiece;
    a camera system associated with the housing and configured to generate image information for the workpiece, the camera system comprising at least a first camera and a second camera, the first camera configured to generate image information at a location of the workpiece prior to the tool system performing a number of operations and the second camera configured to generate image information at the location of the workpiece after the tool system performing a number of operations; and
    a controller associated with the housing and configured to receive the image information from the camera system, control the positioning system to move the workpiece and the tool system relative to each other, and control the tool system to perform the number of operations on a number of inconsistencies on the workpiece using the image information.

2. The apparatus of claim 1, wherein the controller is configured to control the positioning system to move the workpiece and the tool system relative to each other using the image information.

3. The apparatus of claim 1, wherein the number of operations comprises at least one of removing the number of inconsistencies and reducing a size of the number of inconsistencies.

4. The apparatus of claim 1, wherein the workpiece has a number of holes with the number of inconsistencies and wherein the number of operations comprises creating a beveled edge in each of the number of holes.

5. The apparatus of claim 1, further comprising a third camera, the second camera and the third camera positioned at a substantially equal axial position with respect to the workpiece, the first camera and the second camera positioned on a first side of the workpiece, and the third camera positioned on a second side of the workpiece, wherein the workpiece has a number of holes with the number of inconsistencies, wherein the workpiece is configured to move in a direction of travel such that the first camera obtains information from a hole in the number of holes, and wherein the controller is further configured to receive additional image information from the second camera and the third camera after the number of operations have been performed on the number of inconsistencies for the number of holes.

6. The apparatus of claim 5, wherein the controller is further configured to determine whether the number of holes has a desired quality using the additional image information.

7. The apparatus of claim 5, wherein the controller is further configured to obtain identification information from the image information and create inspection data using the additional image information.

8. The apparatus of claim 1, wherein the controller is further configured to control the positioning system to move the workpiece and the tool system relative to each other by moving with a set of rollers at least one of the workpiece and the tool system.

9. The apparatus of claim 1, wherein the positioning system is configured to move the workpiece along an x-axis and the tool system is configured to move along a y-axis and a z-axis.

10. The apparatus of claim 1, wherein the tool system comprises:
    a number of tools.

11. The apparatus of claim 1, wherein the tool system is a deburring unit comprising a number of deburring tools.

12. The apparatus of claim 10, wherein each tool in the number of tools comprises:
    a spindle;
    a deburring tool;
    a tool holder associated with the spindle and configured to hold the deburring tool; and
    a motor associated with the spindle, wherein the motor is configured to rotate the spindle.

13. The apparatus of claim 10, wherein the workpiece has a number of holes with the number of inconsistencies and wherein each tool in the number of tools is configured to remove an inconsistency from a hole of a different size from another tool in the number of tools.

14. The apparatus of claim 13, wherein the controller is further configured to select a tool from the number of tools for performing an operation on the hole in the number of holes based on a size of the hole.

15. The apparatus of claim 1, wherein the workpiece comprises a splice plate.

16. The apparatus of claim 15, wherein the splice plate is for a fuselage of an aircraft.

17. The apparatus of claim 1, wherein the housing is portable.

18. A portable deburring unit for deburring splices for a fuselage of an aircraft, the portable deburring unit comprising:
    a portable housing;
    a deburring unit associated with the portable housing and configured to move along a y-axis and a z-axis in which the deburring unit comprises a number of deburring tools in which each deburring tool in the number of deburring tools comprises a spindle, a deburring tool, a tool holder associated with the spindle and configured to hold the deburring tool, and a motor associated with the spindle in which the motor is configured to rotate the spindle, and in which the each deburring tool in the number of deburring tools is configured to remove an inconsistency from a hole of a different size from another deburring tool in the number of deburring tools;
    a positioning system associated with the portable housing and configured to move a splice along an x-axis;
    a camera system associated with the portable housing and configured to generate image information for a splice plate; and
    a controller associated with the portable housing and configured to receive the image information from the camera system; control the positioning system to move the splice plate and the deburring unit relative to each other using the image information by moving at least one of the splice plate and the deburring unit; select the deburring tool from the number of deburring tools for performing an operation on the hole in a number of holes based on a size of the hole; control the deburring unit to perform a number of operations on a number of inconsistencies for the number of holes using the image information in which the number of operations comprises at least one of removing the number of inconsistencies, reducing a size of the number of inconsistencies, and creating a beveled edge in each of the number of holes; receive additional image information after the number of operations has been performed on the number of inconsistencies for the number of holes; determine whether the number of holes has a desired quality using the additional image information; obtain identification information from the image information; and create inspection data using the additional information.

19. A method for performing an operation on a workpiece, the method comprising:
   moving the workpiece with a number of inconsistencies and a tool system relative to each other under a control of the controller in which the tool system is associated with a housing;
   receiving image information of an inconsistency on the workpiece from a first camera in a camera system at a controller as the workpiece moves with respect to the first camera, in which the camera system and the controller are associated with the housing;
   performing a number of operations on the number of inconsistencies on the workpiece using the image information under the control of the controller; and
   receiving image information of the inconsistency on the workpiece from a second camera in the camera system at a controller as the workpiece moves with respect to the second camera.

20. The method of claim 19, wherein the step of moving the workpiece with the number of inconsistencies and the tool system relative to each other comprises:
   moving the workpiece with the number of inconsistencies and the tool system relative to each other using the image information, wherein the workpiece has a number of holes with the number of inconsistencies.

21. The method of claim 19, wherein the step of moving the workpiece with the number of inconsistencies and the tool system relative to each other comprises:
   locating each of the number of inconsistencies using the image information; and
   moving the tool system and the workpiece such that the tool system reaches the each of the number of inconsistencies.

22. The method of claim 19, wherein the workpiece has a number of holes with the number of inconsistencies and the number of operations comprises at least one of removing the number of inconsistencies, reducing a size of the number of inconsistencies, and creating a beveled edge in each of the number of holes.

23. The method of claim 22 further comprising:
   determining, by the controller, whether the number of holes has a desired quality using additional image information.

24. The method of claim 23 further comprising:
   obtaining, by the controller, identification information from the image information; and
   creating, by the controller, inspection data using the additional image information.

25. The method of claim 19, wherein the tool system comprises:
   a number of tools.

26. The method of claim 19, wherein the tool system is a deburring unit comprising a number of deburring tools.

27. The method of claim 25, wherein each tool in the number of tools is configured to remove an inconsistency from a hole of a different size from another tool in the number of tools.

28. The method of claim 27 further comprising:
   selecting, by the controller, a tool from the number of tools for performing an operation on a hole in a number of holes based on a size of the hole.

29. The method of claim 19, wherein the workpiece comprises a splice plate.

30. The method of claim 19, wherein the housing is portable.

31. A method for performing an operation on a splice plate for an aircraft, the method comprising:
   receiving image information from a camera system at a controller in which the camera system and the controller are associated with a housing;
   moving a workpiece with a number of holes with a number of inconsistencies and a deburring unit relative to each other under a control of the controller using the image information in which the deburring unit is associated with the housing, in which the deburring unit has a number of deburring tools, and in which each deburring tool in the number of deburring tools is configured to remove an inconsistency from a hole of a different size from another deburring tool in the number of deburring tools;
   selecting, by the controller, a deburring tool from the number of deburring tools for performing an operation on a hole in the number of holes based on a size of the hole;
   performing a number of operations on the number of inconsistencies for the number of holes using the image information under the control of the controller in which the number of operations comprises at least one of removing the number of inconsistencies, reducing a size of the number of inconsistencies, and creating a beveled edge in each of the number of holes;
   determining, by the controller, whether the number of holes has a desired quality using additional image information; and
   obtaining, by the controller, identification information from the image information; and creating, by the controller, inspection data using the additional image information.

* * * * *